US006922671B2

(12) United States Patent
Musa et al.

(10) Patent No.: US 6,922,671 B2
(45) Date of Patent: Jul. 26, 2005

(54) SYSTEM AND METHOD FOR GROUPING COMPANIES ACCORDING TO ACCOUNTING SYSTEM OR RULES

(75) Inventors: Mark Anthony Musa, Brackney, PA (US); Thomas William Rath, Owego, NY (US); Russell Thomas White, Jr., Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 09/815,320

(22) Filed: Mar. 22, 2001

(65) Prior Publication Data

US 2002/0138283 A1 Sep. 26, 2002

(51) Int. Cl.[7] .............................................. G06F 17/60
(52) U.S. Cl. ......................................................... 705/1
(58) Field of Search .............................. 705/52, 68, 51, 705/36, 1, 26, 27, 35

(56) References Cited

U.S. PATENT DOCUMENTS

| | | | | |
|---|---|---|---|---|
| 4,799,156 A | * | 1/1989 | Shavit et al. | 705/26 |
| 5,721,832 A | * | 2/1998 | Westrope et al. | 705/27 |
| 5,970,475 A | * | 10/1999 | Barnes et al. | 705/27 |
| 6,029,150 A | * | 2/2000 | Kravitz | 705/39 |
| 6,058,381 A | * | 5/2000 | Nelson | 705/40 |
| 6,128,602 A | * | 10/2000 | Northington et al. | 705/35 |
| 6,343,284 B1 | * | 1/2002 | Ishikawa et al. | 705/40 |
| 6,418,420 B1 | * | 7/2002 | DiGiorgio et al. | 705/40 |

OTHER PUBLICATIONS

All Open Orders For Customer, Nov. 23, 1999, Motorola.*
Elaine Marmel and Diane Koers, Peachtree 8 For Dummies, © 2000, Hungry Minds, Inc.*
David Kroenke, Database Processing, © 1983, 1977, Science Research Associates, Inc.*
Deitel & Deitel, Java How To Program, © 1998, 1997, Prentice-Hall.*
State of Texas Statewide Electronic Commerce Feasibility Study; May 15, 1998; Phoenix Planning & Evaluation, LTD. Rockville, MD 20852.x.*

* cited by examiner

Primary Examiner—John G. Weiss
Assistant Examiner—Naresh Vig
(74) Attorney, Agent, or Firm—William E. Schiesser; Shelley M Beckstrand

(57) ABSTRACT

A system and method for organizing program code and database objects implemented within an enterprise server in support of the accounting and/or procurement systems of a plurality of customer companies. The customer companies are organized into groups of companies having the same accounting rules, and a company grouping code assigned to each company group. Responsive to input through a browser of a requisition request and user ID including a password, a user profile database is accessed to determine the user's company grouping code. Responsive to the company grouping code, a URL or other type of program call to company specific accounting rules is generated to apply appropriate accounting procedures and program logic. Responsive to the program logic and accounting rules accessed by, for example, that URL, the requisition request is applied and validated against company specific data in a common database.

12 Claims, 4 Drawing Sheets

| COMPANY GROUP CODE | COMPANY ID | DEPT ID | GL ACCOUNT |
|---|---|---|---|
| CARRIER | CCDD<br>CACD<br>⋮ | ⋮ | ⋮ |
| IBM | 0147<br>0148 | ⋮ | ⋮ |

DATA TABLE

FIG. 4

SYSTEM AND METHOD FOR GROUPING COMPANIES ACCORDING TO ACCOUNTING SYSTEM OR RULES

CROSS REFERENCE TO RELATED APPLICATIONS

The following U.S. patent applications, filed concurrently or otherwise copending, are assigned to the assignee hereof and contain subject matter related, in certain respect, to the subject matter of the present application.

Ser. No. 09/657,215, filed 7 Sep. 2000, entitled "System and Method for Clustering Servers for Performance and Load Balancing";
Ser. No. 09/657,216, filed 7 Sep. 2000, entitled "System and Method for Front End Business Logic and Validation";
Ser. No. 09/657,217, filed 7 Sep. 2000, entitled "System and Method for Data Transfer With Respect to External Applications";
Ser. No. 09/656,037, filed 7 Sep. 2000, entitled "System and Method for Providing a Relational Database Backend";
Ser. No. 09/656,803, filed 7 Sep. 2000, entitled "System and Method for Providing a Role Table GUI via Company Group";
Ser. No. 09/656,967, filed 7 Sep. 2000, entitled "System and Method for Populating HTML Forms Using Relational Database Agents";
Ser. No. 09/657,196, filed 7 Sep. 2000, entitled "System and Method for Catalog Administration Using Supplier Provided Flat Files";
Ser. No. 09/657,195, filed 7 Sep. 2000, entitled "System and Method for Providing an Application Navigator Client Menu Side Bar";
Ser. No. 09/819,462, filed 28 Mar. 2001, entitled "SYSTEM AND METHOD FOR AUTOMATING INVOICE PROCESSING WITH POSITIVE CONFIRMATION";
Ser. No. 09/815,318, filed 22 Mar. 2001, entitled "SYSTEM AND METHOD FOR GENERATING A COMPANY GROUP USER PROFILE";
Ser. No. 09/819.437, filed 28 Mar. 2001, entitled "SYSTEM AND METHOD FOR SHARING DATA ACROSS FRAMES USING ENVIRONMENT VARIABLES";
Ser. No. 09/815,317, filed 22 Mar. 2001, entitled "SYSTEM AND METHOD FOR SYNCHRONIZING LEDGER ACCOUNTS BY COMPANY GROUP";
Ser. No. 09/815,316, filed 22 Mar. 2001, entitled "SYSTEM AND METHOD FOR FRAME STORAGE OF EXECUTABLE CODE";
Ser. No. 09/815,313 entitled "SYSTEM AND METHOD FOR INVOICE IMAGING THROUGH NEGATIVE CONFIRMATION PROCESS";
Ser. No. 09/815,312 entitled "SYSTEM AND METHOD FOR LEVERAGING PROCUREMENT ACROSS COMPANIES AND COMPANY GROUPS";
Ser. No. 09/816,264 entitled "SYSTEM AND METHOD FOR PROCESSING TAX CODES BY COMPANY GROUP"; and
Ser. No. 09/798,596 filed 2 Mar. 2001, entitled "SYSTEM AND METHOD FOR MANAGING INTERNET TRADING NETWORKS".

The above-identified patent applications are incorporated herein by reference.

BACKGROUND OF THE INVENTION

1. Technical Field of the Invention

This invention pertains to a procurement and accounting system. More particularly, it relates to a system for grouping companies according to accounting system or rules, and for executing program logic and access to data by company grouping.

2. Background Art

An enterprise may vend its procurement and accounting services to other companies. This requires that the enterprise provide within its server accounting application code and data in support of the procurement activities of its customers. Heretofore, it has been required for the enterprise to provide a separate accounting application and database for each such customer. This results in very complex code development and maintenance requirements to support each customer. When the enterprise desires to update, for example, code implementing a particular accounting procedure, it must change the code for that procedure in the application for each customer company.

Further, for example, referring to FIG. 2, enterprise server application program logic 330 may include at statement 332 a call to a routine FINSUM.HTML 334. If the enterprise desires to provide, or is providing, procurement and accounting services to several customer companies which have different accounting rules which must be executed within FINSUM.HTML, then a separate server including separate application program logic 330 must be provided for each company.

It is an object of the invention to provide an improved system and method for providing accounting and procurement services to a plurality of customer companies.

It is a further object of the invention to provide a system and method requiring a single server and common application program logic and data storage to provide accounting and procurement services to a plurality of customer companies having different accounting rules.

SUMMARY OF THE INVENTION

A system and method for organizing program code and database objects by creating a company grouping code for each of a plurality of company groups; responsive to input through a browser of a requisition request and user ID including a password, accessing a user profile database to determine the user's company grouping code; and responsive to the code, generating a URL to company specific accounting rules to apply appropriate accounting procedures and program logic on behalf of the company group.

In accordance with an aspect of the invention, there is provided a computer program product configured to be operable to organizing program code and database objects implemented within an enterprise server in support of the accounting and/or procurement systems of a plurality of customer companies organized in company groupings.

Other features and advantages of this invention will become apparent from the following detailed description of the presently preferred embodiment of the invention, taken in conjunction with the accompanying drawings.

BRIEF DESCRIPTION OF THE DRAWINGS

FIG. 4 is a diagram illustrating an example of the data table of FIG. 3 accessed by company group code.

BEST MODE FOR CARRYING OUT THE INVENTION

Figure 1:
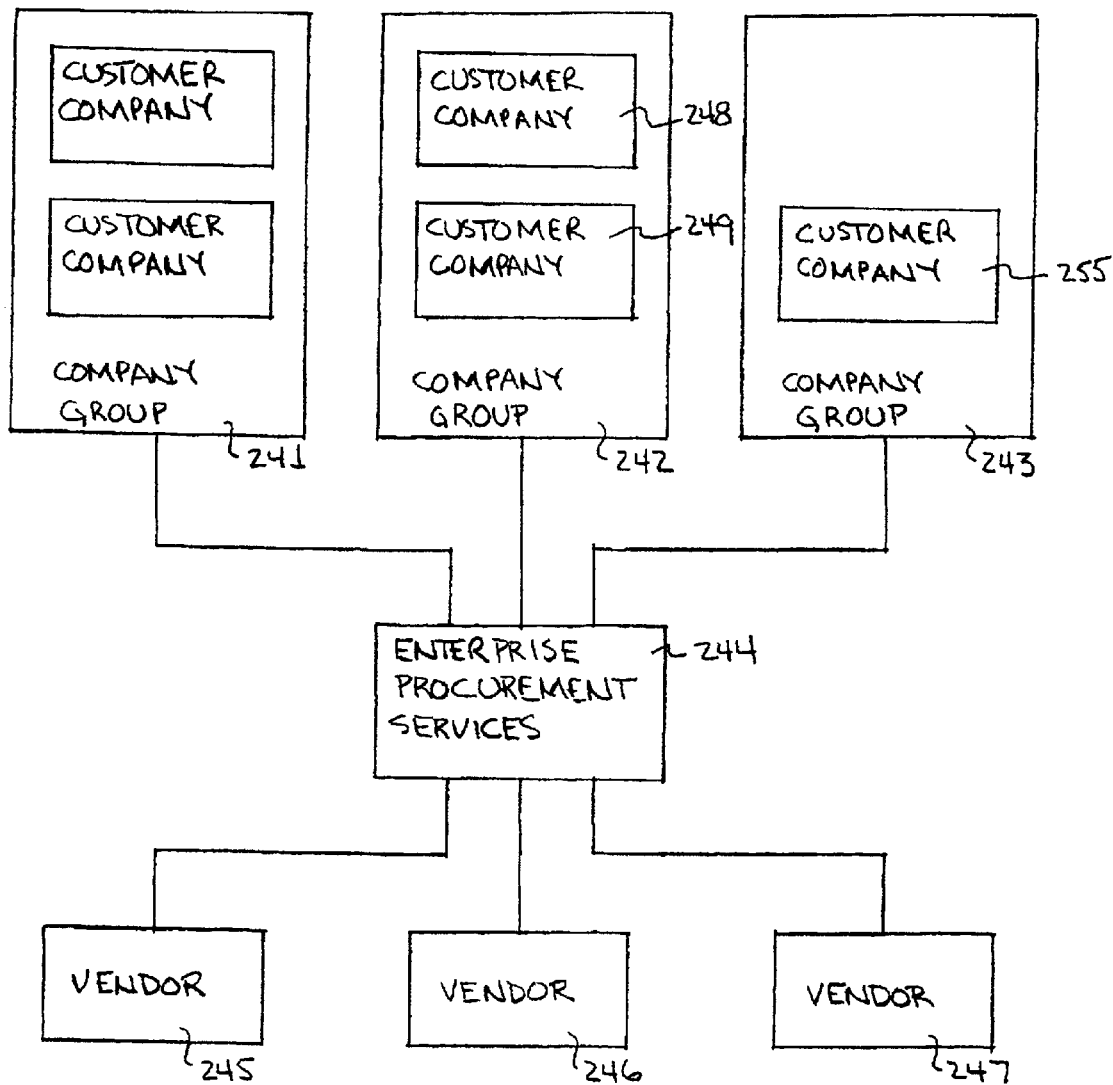
FIG. 1 is a high level system diagram illustrating an enterprise system for providing procurement services with respect to a plurality of vendors on behalf of a plurality of company groups of related customer companies in accordance with the preferred embodiment of the invention.
Figure 2:
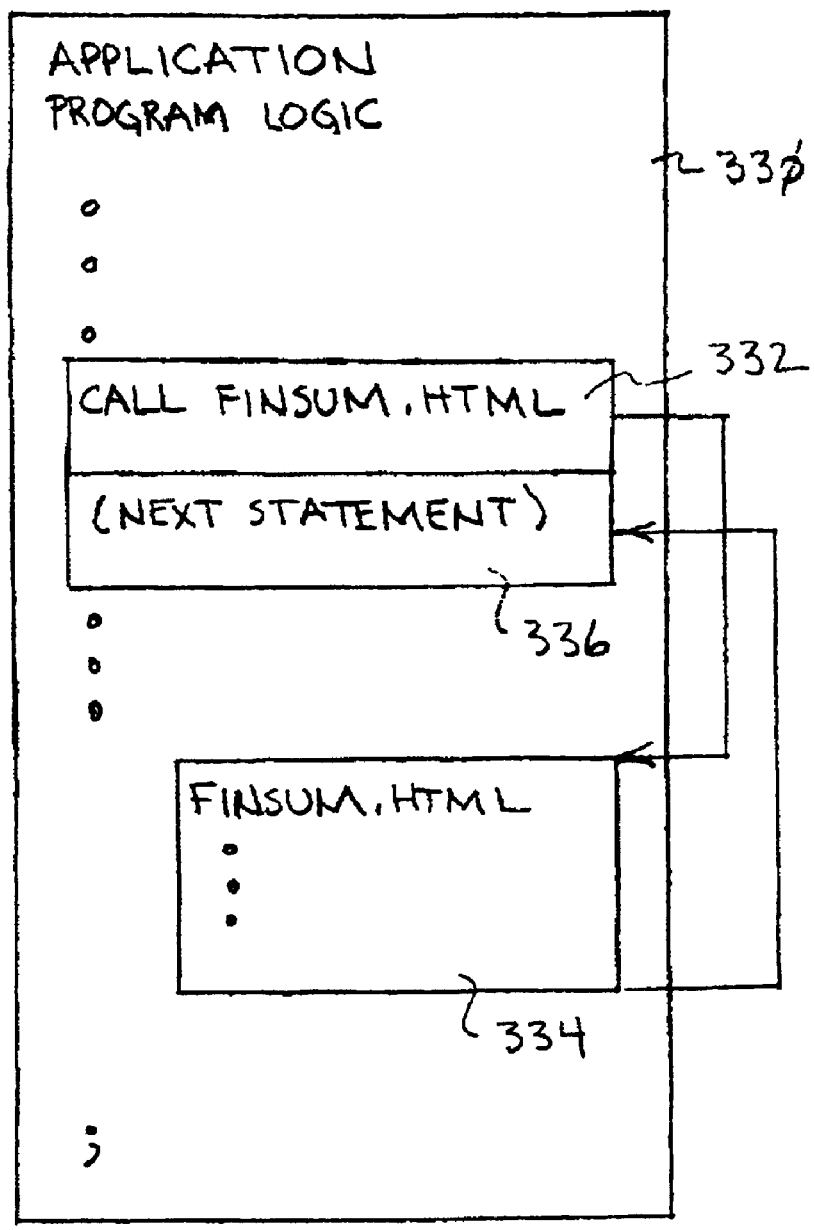
FIG. 2 is a diagram illustrating a call to financial accounting routine within application program logic in accordance with the prior art.

Referring to FIG. 1, the procurement services organization of an enterprise 244 provides procurement services to a plurality of companies 248, 249 organized in a plurality of company groups 241–243 with respect to a plurality of vendors 245–247.

Figure 3:
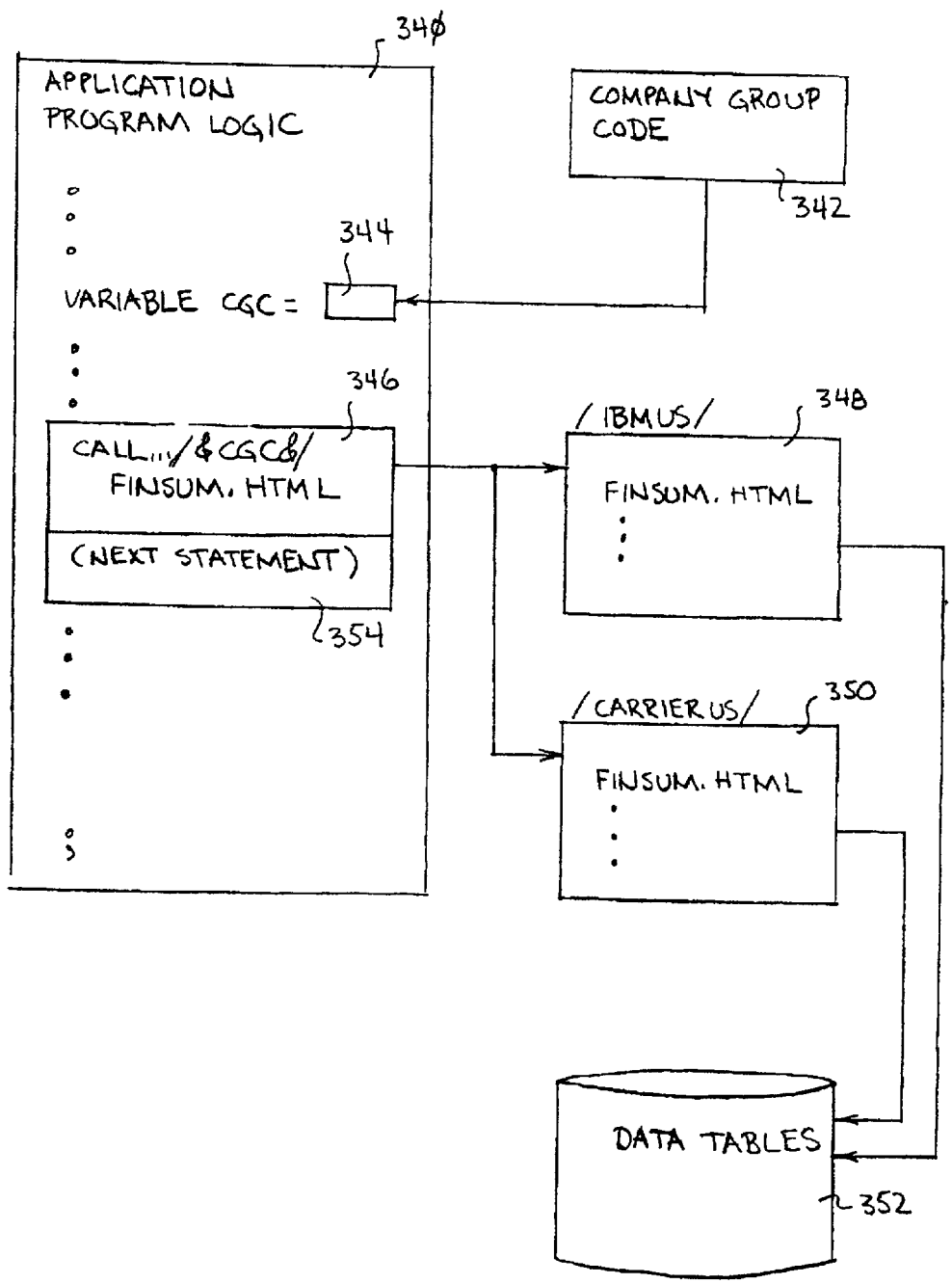
FIG. 3 is a diagram illustrating the company grouping code variable and its use within a system in accordance with the preferred embodiment of the invention.

Referring to FIG. 3, in accordance with the preferred embodiment of the invention, a subdirectory structure is provided to enable common procurement services application code 340 and data storage 352 to support multiple companies 248 with separate accounting rules within one server. This subdirectory structure (such as is generated within call 346) includes (in this example) a variable CGC, which is set to company grouping codes 342, such that the company grouping code 344 is part of the URL used to dynamically call accounting procedures 348, 350 and access accounting data 352 associated with a particular company group. A user identified to a company within the company group IBMUS will have variable CGC 344 set to IBMUS, and call 346 will have its URL set to the subdirectory IBMUS and will, therefore, call the routine FINSUM.HTML at subdirectory <.../IBMUS/FINSUM.HTML> 348. Thus, common application software 340 executing in a server common to a plurality of companies may call and access procedures 348, 350 and data 352 unique to a company group. In this manner, the base code represented by logic 340 is rendered applicable to financial services provided to many customer companies.

The following examples illustrate the use of the variable CGC, or the equivalent variable "companygroupcode", in generating URLs for calls to procedures or SQL calls to data.

Code examples (1) and (2) illustrate use of company group codes in agent code. In example (1), the agent obtains the company group code, and in example (2), the agent uses it to produce browser output.

(1) cgc=db2.profile.companygroupcode
(2) print "<a href='/transform/reqcat/" & cgc & "/finsum.html'">

As shown in code example (2), when the agent writes to the browser, the company group code "ibmus" will replace the variable "cgc". The above agent code (2) produces the following example (3) code, which shows browser JavaScript with the company group code "ibmus" embedded as part of the URL.

Code examples (3) and (4) illustrate Browser JavaScript code segments for users from two different company groups, ibmus and carrierus:

(3) <a href='/transform/reqcat/ibmus/finsum.html'>
(4) <a href='/transform/reqcat/carrierus/finsum.html'>

The following illustrate the use of company group codes in the agent to access company-group-code specific information from the various DB2 accounting tables. That is, to select account number from the DB2 table g1_accounts for company group codes in variable cgc. If the company group code cgc is ibmus, then the account number contains ibmus accounts. If the company group code is carrierus, then account number contains carrierus accounts. In doing so, the db2 tables can simultaneously contain account numbers for both company groups.

(5) select accountnum from $gl_{13}$ accounts where companygroup=cgc

This allows one server, accessing a single database, to provide procurement services to users from a plurality of company groups, where the company groups have unique accounting rules and procedures. Unique company group specific code can be run against the same database utilizing unique company specific data.

FIG. 4 is a diagram illustrating an example of the data table of FIG. 3 accessed by company group code.

Advantages over the Prior Art

It is an advantage of the invention that there is provided an improved system and method for providing accounting and procurement services to a plurality of customer companies.

It is a further advantage of the invention that there is provided a system and method implemented within a single server and including common application program logic and data storage to provide accounting and procurement services to a plurality of customer companies having different accounting rules.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for organizing program code and database objects, comprising the steps of:

creating a company grouping code for each of a plurality of company groups;

responsive to input through a browser of a requisition request and user ID including a password, accessing a user profile database to determine the user's company grouping code; and responsive to said code, generating a URL to company specific accounting rules to apply appropriate accounting procedures and program logic on behalf of said company group.

2. The method of claim 1, further comprising the step responsive to said program logic and accounting rules of applying to and validating said requisition request against company specific data in a common database.

3. The method of claim 1, said company group including a plurality of customer companies using the same accounting rules.

4. The method of claim 3, further comprising the step of generating said URL within common application code executed on behalf of a plurality of said company groups, each company group comprising one or more customer companies of an enterprise providing requisition and catalog services.

5. The method of claim 4, further comprising the step of providing said requisition and catalog services via a web communication system.

6. The method of claim 4, further comprising the steps of:

accessing a relational database of information pertinent to said requisition request via an SQL call including reference to said company group code.

7. System for organizing program code and database objects in a requisition and catalog system, comprising:

a table of company grouping codes associating within each of a plurality of company groups a plurality of customer companies;

base program logic for managing requisition and catalog system services on behalf of all said company groups;

at least two versions of a company group specific accounting procedure;

a call to said company group specific accounting procedure including address indicia referencing a code from said table of company grouping codes.

8. A method for organizing program code and database objects implemented within an enterprise server in support of the accounting and/or procurement systems of a plurality of customer companies, comprising the steps of:

organizing said customer companies into groups of companies having the same accounting rules;

assigning a company grouping code to each said company group;

responsive to input through a browser of a requisition request and user ID including a password, accessing a user profile database to determine said company grouping code corresponding to said user ID; and responsive to said company grouping code, generating a URL to company specific accounting rules to apply company group specific accounting procedures and program logic to said requisition request.

9. The method of claim 8, further comprising the step responsive to said program logic and accounting rules accessed by said URL of applying and validating said requisition request against company specific data in a common database.

10. A program storage device readable by a machine, tangibly embodying a program of instructions executable by a machine to perform method steps for organizing program code and database objects in a requisition and catalog system, said method steps comprising:

creating a company grouping code for each of a plurality of company groups;

responsive to input through a browser of a requisition request and user ID including a password, accessing a user profile database to determine the user's company grouping code; and responsive to said code, generating a URL to company specific accounting rules to apply appropriate accounting procedures and program logic on behalf of said company group.

11. The program storage device of claim 10, said company group including a plurality of customer companies using the same accounting rules and said method steps further comprising:

generating said URL within common application code executed on behalf of a plurality said company groups, each company group comprising one or more customer companies of an enterprise providing requisition and catalog services.

12. A computer program product or computer program element for organizing program code and database objects in a requisition and catalog system according to method steps comprising:

creating a company grouping code for each of a plurality of company groups;

responsive to input through a browser of a requisition request and user ID including a password, accessing a user profile database to determine the user's company grouping code; and responsive to said code, generating a URL to company specific accounting rules to apply appropriate accounting procedures and program logic on behalf of said company group.

* * * * *